May 13, 1930.  H. A. DE VRY  1,758,221
MOTION PICTURE CAMERA
Filed Oct. 21, 1925  5 Sheets-Sheet 1
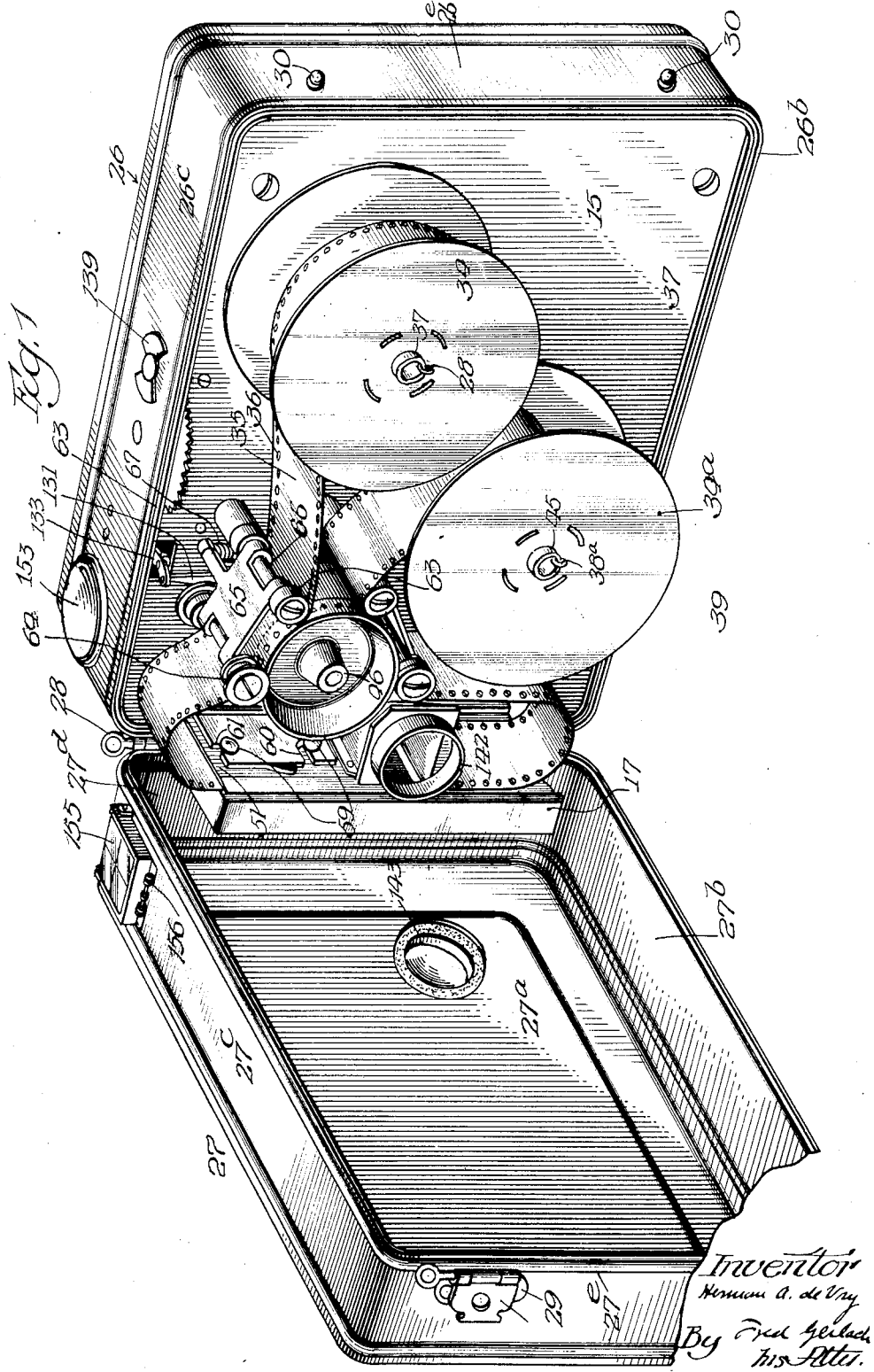
Inventor
Herman A. de Vry
By Fred Gerlach
his Atty.

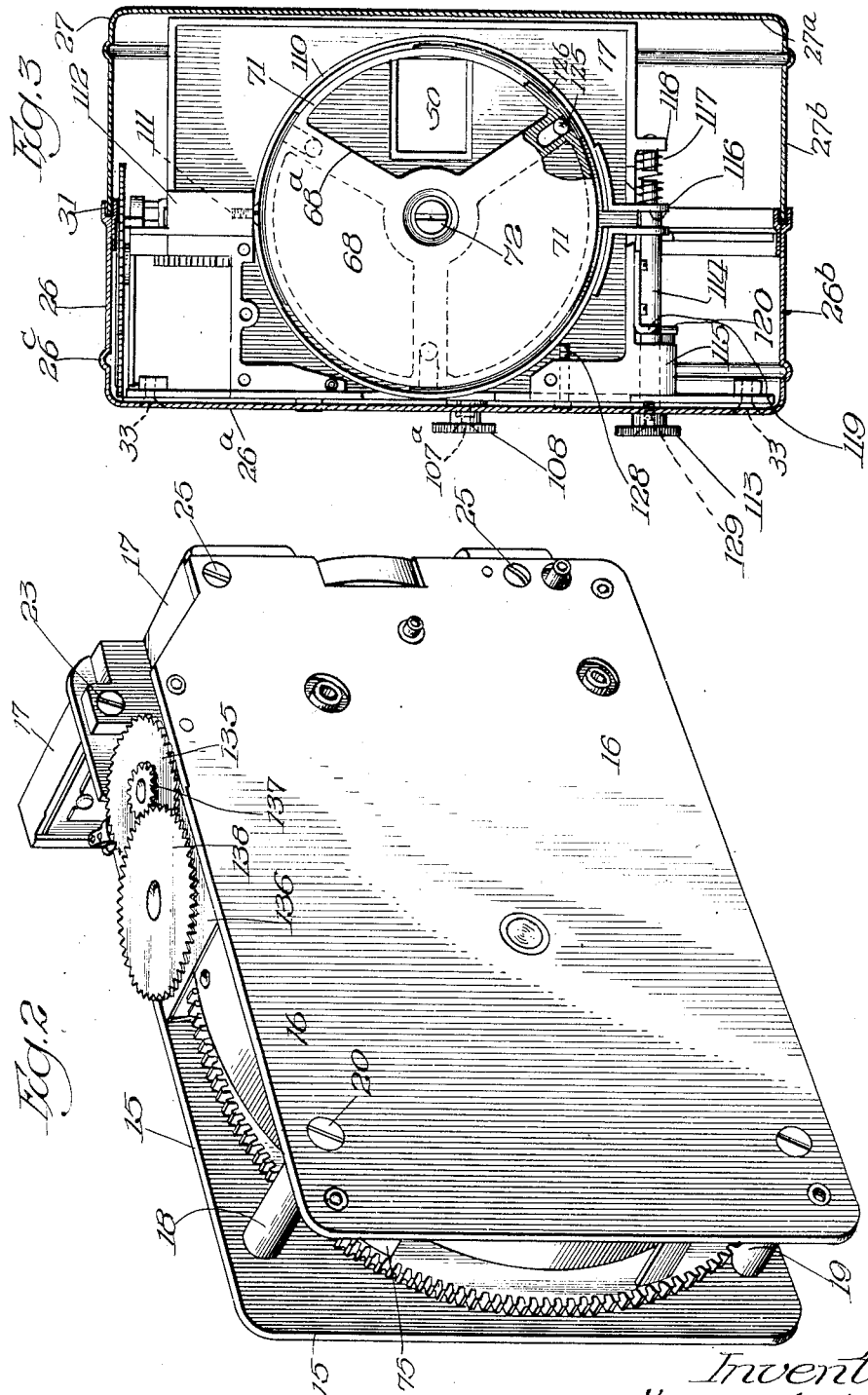

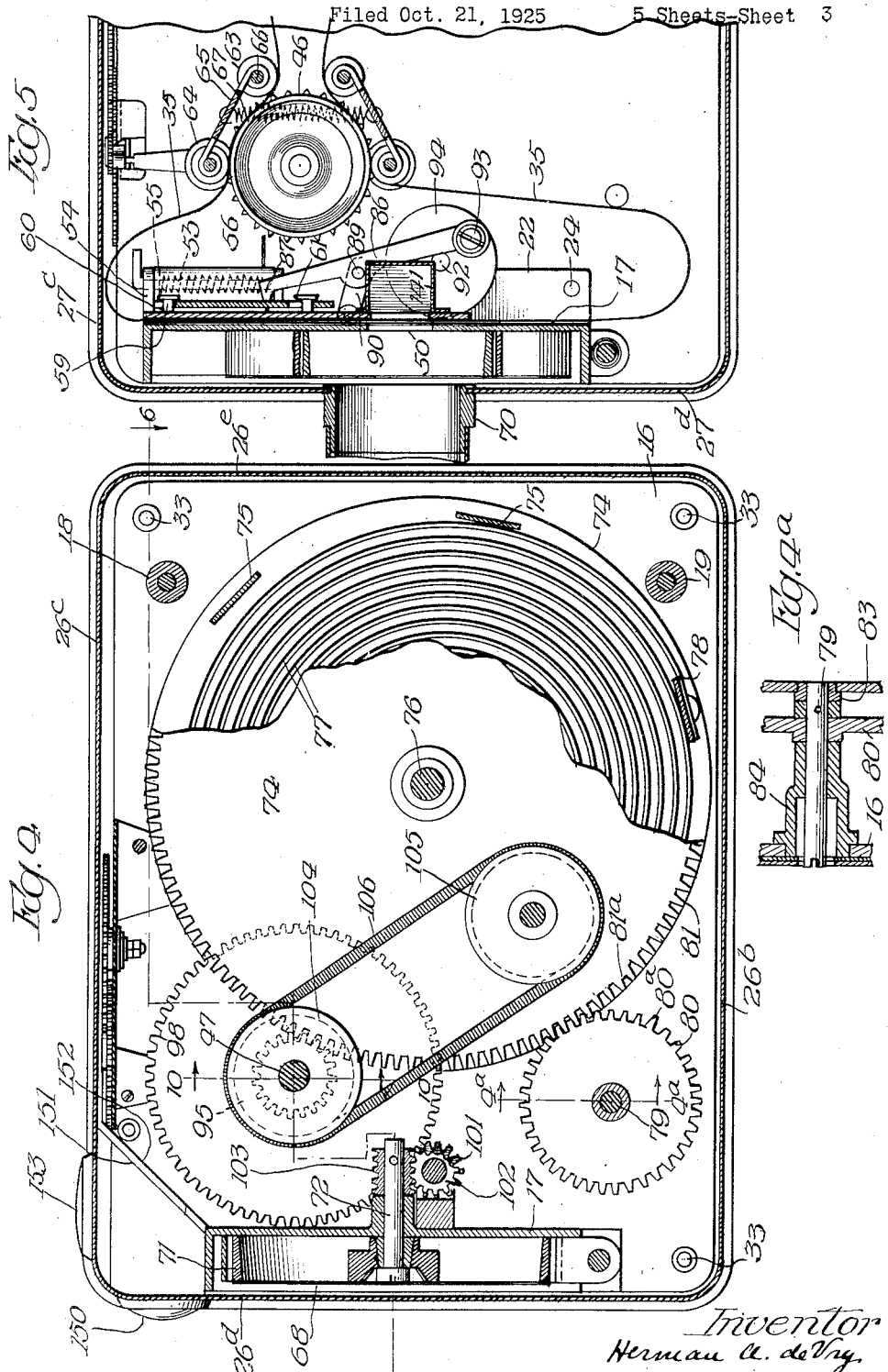

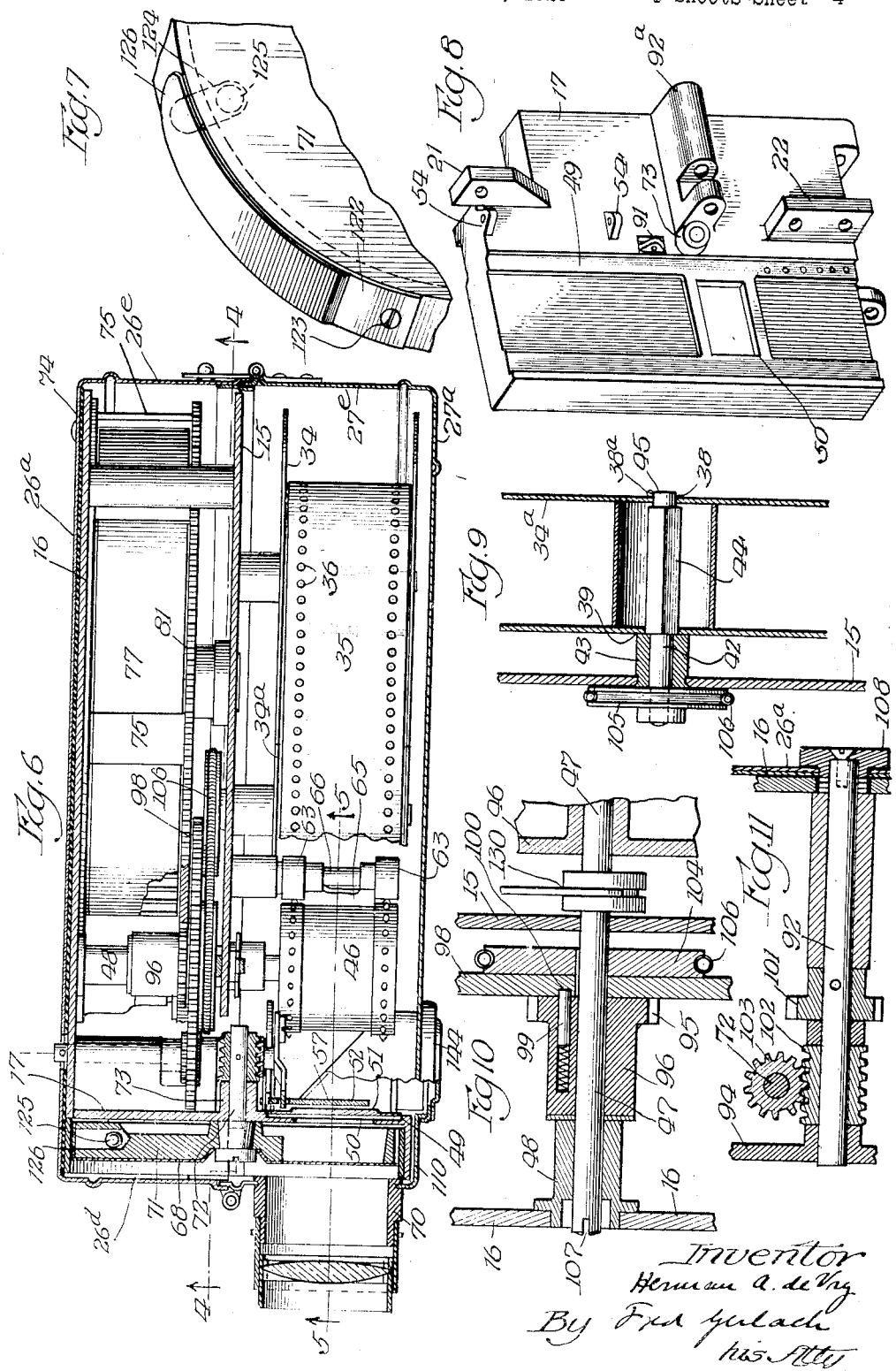

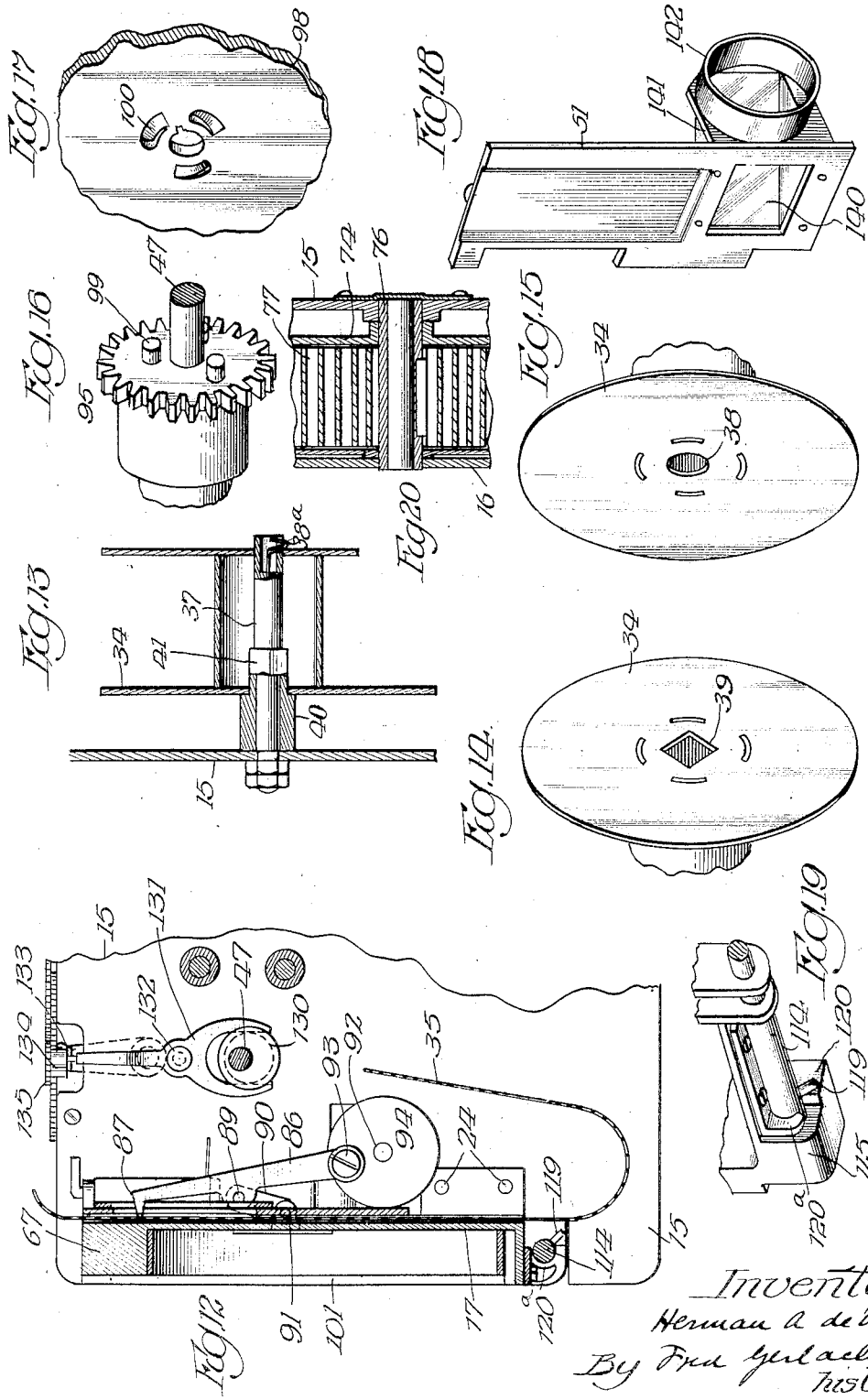

Patented May 13, 1930

1,758,221

UNITED STATES PATENT OFFICE

HERMAN A. DE VRY, OF CHICAGO, ILLINOIS, ASSIGNOR TO Q. R. S.-DE VRY CORPORATION, OF CHICAGO, ILLINOIS, A CORPORATION OF ILLINOIS

MOTION-PICTURE CAMERA

Application filed October 21, 1925. Serial No. 63,846.

The invention relates to motion-picture cameras.

One object of the invention is to provide an improved motion-picture camera, in which the operating parts for a standard size film are compactly arranged, and so mounted in the enclosing case, that they will be readily accessible for threading of the film, and inspection when the case is open. Another object is to provide improved and simple means for regulating and controlling the operation of the camera in making exposures. Other objects of the invention will appear from the detailed description.

The invention consists in the several novel features hereinafter set forth, and more particularly defined by claims at the conclusion hereof.

In the drawings: Fig. 1 is a perspective of a camera embodying the invention, the casing being open to provide access to the film and film-feeding mechanism. Fig. 2 is a perspective of the frame-structure, in which all of the operating parts are mounted, removed from the case. Fig. 3 is a transverse section looking at the front of the shutter. Fig. 4 is a longitudinal section taken on the line 4—4 of Fig. 6. Fig. 4ª is a transverse section showing the winding shaft for the spring motor. Fig. 5 is a section taken on line 5—5 of Fig. 6. Fig. 6 is a section taken on line 6—6 of Fig. 4. Fig. 7 is a detail perspective of one of the centrifugally controlled controlling strips and a portion of a shutter-wheel. Fig. 8 is a perspective of the front plate of the supporting structure. Fig. 9 is a section through the take-up spool, its shaft being shown in elevation. Fig. 10 is a section taken on line 10—10 of Fig. 4. Fig. 11 is a transverse section, showing a part of the gearing for operating the shutter-wheel. Fig. 12 is a vertical section, showing the intermittent feed-device for the film and the lever for operating the indicator for the amount of film which has been exposed. Fig. 13 is a detail, showing the supporting shaft for the supply spool. Figs. 14 and 15 are details, showing the openings in the sides of the film-spool respectively. Figs 16 and 17 are details of the ratchet connection in the gearing for operating the film-feed mechanism. Fig. 18 is a perspective of the presser-plate for the film. Fig. 19 is a detail perspective of the controlling device for the brake-band which controls the operation of the camera by the motor. Fig. 20 is a detail section of the spring motor.

The invention is exemplified in a camera with a supporting structure or frame, in which all of the operating parts are mounted independently of the enclosing case, and which comprises side plates 15 and 16 and a front plate 17. The side plates are preferably formed of sheet metal, and the front plate of a casting. The side plates are spaced apart by the front plate 17 and transverse spacing posts 18 and 19 (Figs. 4 and 6), to which the side plates are secured by screws 20. The front plate 17 is provided with rearwardly extending integral lugs 21 and 22 (Fig. 8), to which the side plate 15 is secured by screws 23 and 24 respectively. Plate 16 is secured by screws 25 to one end of the front plate 17 (Fig. 2).

The enclosing and carrying case is preferably formed of sheet metal, is substantially rectangular in shape, and consists of a body 26 and a cover-section 27. The body comprises a side wall 26ª, bottom wall 26ᵇ, a top wall 26ᶜ, a front wall 26ᵈ and a back wall 26ᵉ. The supporting frame or structure is formed to conform to and fit in the body-section, and the side plate 15 thereof is positioned substantially in the plane of the edges at the open side of the body, so that when the case is open, the film, take-up and supply spools and the film-feed and guide-mechanism will all be substantially outside of the section and readily accessible to permit the film to be conveniently threaded and manipulated. The cover 27 comprises a side 27ª, a bottom 27ᵇ, a top 27ᶜ, a front 27ᵈ and a back 27ᵉ. The body and cover sections of the case are connected together at the front thereof by hinges 28, and are held closed by hinged latches 29 which are carried by the back 27ᵉ of the cover, and are adapted to snap over buttons 30 on the back 26ᵉ of the body-section. To effect a light-tight closure between the cover and the body of the case, the margin at the open side of the cover is adapted to enter a marginal groove 31 in the body-section. The frame structure is removably secured in the case by screws 33 which extend through the side 26ᵃ of the case and are threaded into the frame-side 16. By removing the screws, the entire frame structure, on and in which all of the parts in the case are mounted, may be removed through the open side of the body-section. This construction exemplifies one in which the cover-section of the case is formed to enclose the film-spools and feed-mechanism which are mounted to operate at the outer side of the frame-plate 15, so that when the cover is open, as shown in Fig. 1, all of the operating parts carried at the outer side of said plate will be conveniently accessible. Also one in which the frame structure, with all the working parts in the case, may be unitarily removed from and placed into the case.

A supply spool 34 contains a roll of film 35, which has its margins provided with the usual perforations 36. This spool is rotatable on, and removable endwise from, a shaft 37 (Fig. 13) which has its inner end fixed in the frame-side 15. One side of the film-spool is provided with a circular opening 38 (Fig. 15) to fit said shaft, and the other side with a polygonal opening 39 (Fig 14), so that it may be rotated by the take-up shaft when the spool is used as a film take-up. A sleeve 40, provided with a polygonal portion 41, adapted to fit into the square hole 39, is rotatably held on the shaft 37. The take-up spool 34ᵃ is similar in construction to the spool 34, so they may be interchangeably used, and is endwise removable from a shaft 42 (Fig. 9), which is journalled in a bushing 43 which is fixed in the frame-plate 15. Shaft 42 is provided with a square portion 44 fitting in the square hole 39 in one side of the spool 34ᵃ to drivably connect the spool to the shaft. The outer end of shaft 42 is round, as at 45, to fit into the round hole 38 in the other spool-side. A resilient strip or clip 38ᵃ is provided adjacent the free end of each of the shafts 37, 44, to removably hold the spools on said shafts. From the supply-spool, the film 35 passes to a continuously driven feed-sprocket 46, which is fixed to a shaft 47 (Fig. 10), which is journalled in the frame-side 15 and in a bearing-sleeve 48 fixed in the frame-side 16. From the sprocket 46, which draws the film from the supply spool, the film passes in a loose loop to a vertical guideway or channel 49 (Figs. 6 and 8) formed in the back of the frame-plate 17. Said plate is provided with an exposure opening 50, across which the film is fed. A gate-plate 51 fits against the back of the film in the guideway 49, and is held against the film by a gate 52 which is pivotally connected to plate 17 at one side of the frame-plate 15 by means of a pivot-pin 53 which extends through ears 54 integrally formed on the plate 17 and an ear 55 formed on the presser plate. A spring 56, coiled around pin 53, is applied to press the presser against the gate-plate 51. The latter is formed to bear against the central portion of the presser-plate, and is loosely connected thereto by studs 59 (Figs. 1 and 5), which are fixed to the gate-plate and confined in slots 60 and 61 in the presser-plate. From the lower end of the gate-plate, the film passes in the form of a loose loop to the lower portion of the feed-sprocket 46 and thence to the take-up spool 34ᵃ. Rollers 63 guide the film from the supply spool to the sprocket, and grooved rollers 64 hold the film into engaging relation with the sprocket. Rollers 64 are rotatably mounted on an arm 65 (Fig. 5) which is pivoted on a stud 66, which is fixedly held in the frame-side 15. Rollers 63 are journalled on studs 66. The portion of the film passing to the take-up spool is similarly held in engagement with the lower portion of the sprocket and guided to the take-up spool. A spring 67 is applied between the arms 65, to yieldingly press the rollers 64 against the film and hold it in engagement therewith. These guiding devices, when released from the sprocket, permit the loop of the film to be inserted endwise for connection to the sprocket, and the presser-plate 52, being pivoted at its inner side, permits the gate-plate to be separated from guide 49 for endwise insertion of the film into its front guide. The construction described exemplifies one in which the film-feeding mechanism is adapted for endwise insertion for the film, which is mounted at the outer side of the frame-plate, and which is disposed adjacent the open side of the body-section of the case, so that the film may be conveniently and easily threaded without reaching into the case.

The mechanism for intermittently feeding the film in guide 49 across the exposure opening 50, comprises a dog 86 (Fig. 12), which is provided with a tooth 87 which is adapted to work through the gate-plate 51 and presser-plate 52 and enter the perforations in one margin of the film and draw it downwardly the correct distance for a single exposure. This dog is movably fulcrumed at 89 on a link 90 which is pivoted to a lug 91 on the front plate 17, and is operated by a transverse shaft 92 (Fig. 11), which is journalled in lugs 92ᵃ (Fig. 8) formed on said plate 17.

A rotary shutter 68 (Fig. 3) is provided with a segmental opening 68ᵃ to intermittently admit light to the exposure opening 50 in the front plate 17, which is disposed in that portion of said plate which projects outwardly from the frame-plate 15. A photographic holder 70 for a suitable picture-taking lens is mounted in the front 27ᵈ of the cover-section of the case in longitudinal alignment with the exposure opening 50. Shutter 68 is carried by a wheel 71, which is fixed to a shaft 72 (Fig. 6) which is journalled in a bearing 73 in front plate 17.

The camera is operable by a spring-motor which is adapted to be wound up by hand, and comprises a drum with disks or sides 74 rigidly cross-connected by bars 75 and a hub 76 which is journalled in the frame-sides 15 and 16 (Fig. 20). The drum fits and is operable in the space between the frame-sides 15 and 16. A convolute spring 77 has one of its ends fixed to hub 76 and its other end to the drum, as at 78 (Fig. 4). This motor may be wound up by means of a crank applied to a shaft 79 (Fig. 4ª) and a gear 80 fixed to said shaft and meshing with a large gear 81 formed on one of the disks 74 of the drum. Shaft 79 has one of its ends journalled in a bushing 83 which is fixed in the frame-side 16, and in a sleeve 84 which is fixed in the other frame-side 15. The outer end of shaft 79 is provided with a kerf to interfit with a removable crank. Coacting stop teeth 81ª and 80ª on the gears 80 and 81 are adapted to limit the winding of the drum. This construction exemplifies one in which the spring-motor and winding mechanism are disposed between and supported by the plates 15 and 16 of a removable frame structure.

The gearing for driving the continuous and intermittent feed-devices comprises a gear 95 which meshes with the gear 81 on the drum, and is formed on a sleeve 96 which is rotatable on the continuous feed-sprocket shaft 47; a gear 98, which is keyed to said shaft to continuously drive sprocket 46 in one direction from the gear 95 by means of a ratchet connection, consisting of spring-pressed pins 99 (Figs. 10, 16, 17) in sleeve 96 and ratchet notches 100 in gear 98. The intermittent feed is operated by a pinion 101 which is fixed to the shaft 92 and confined thereon by lugs 92ª of the front plate 17, to continuously drive said shaft to cause the film loop to be intermittently fed by the dog 86. The shutter-shaft 72 is continuously rotated to operate the shutter by oblique toothed pinion 102 (Figs. 4, 11) fixed to shaft 92, and meshing with a corresponding gear 103 which is fixed to the shutter shaft 72. The take-up spool is operated to wind up the film released by sprocket 46 by means of a grooved pulley 104, which is fixed to rotate with sprocket-shaft 47 and gear 98, a grooved pulley 105, fixed to the inner end of the take-up spool shaft 44, and an endless coil spring belt 106, which forms a slip connection between said pulleys, as well understood in the art.

In some instances, it is desirable to take moving pictures by operating the camera manually in lieu of by the motor, and for this purpose one end of the shaft 47 is provided with a kerf 107 (Fig. 10) for detachable connection to the crank used for winding the spring drum, the case being provided with a hole through which the hub of the crank may be inserted into a recess 107ª in sleeve 48. The ratchet-connection 99, 100, permits the shaft 47 and gearing operated thereby to be rotated to operate the feed-mechanism and shutter independently of the spring-motor. In some instances, it is desirable to take a single or still picture, and for this purpose the shaft 92 (Fig. 11) is extended through the side 26ª of the case for connection to a thumb-wheel or button 108 at the outside of the case. By turning this button, the film-operating mechanism and shutter may be slowly operated when pictures are to be singly taken. Button 108 is removably secured by a screw 108ª to shaft 92 so the button may be detached when it is desired to remove the frame structure from the case.

The operation of the camera by the spring-motor is controlled by friction means applied to the wheel 71, which carries the shutter. For this purpose, a flexible split band 110 (Fig. 3), disposed around the periphery of said wheel, has its upper portion fixedly secured by means of a screw 111 to a lug 112 on front plate 17, and its lower portion is split so that the band may be expanded and contracted to control, start and stop the wheel. This band is manually controlled by a button 113 which is fixed to a shaft 114 which is rotatable and longitudinally slidable in lugs 115 on front plate 17, is shouldered at 116 to shift one end of the band into an expanded position. A spring 117 is applied to shift the shaft outwardly and contract the band, being confined between said end of the band and a lug 118 formed on the front plate 17. A radial pin 119 on shaft 114 is adapted to be rotated when the shaft has been pushed inwardly to engage the inner face of an abutment 120, to lock the shaft into position to release the band. A lug 120 is provided so the pin 119 may be rotated to hold the shaft against accidental inward movement when the camera is at rest. Normally, button 113 is turned so that pin 119 will be held between outer lug 115 and lug 120 in position to contract the band, so that it will prevent rotation of the wheel 71. To release the wheel, so that the mechanisms will be operated by the spring-motor, the operator will turn the button 113 to release pin 119, then push the button inwardly against the force of spring 117, whereupon the wheel will be released to permit the motor to drive the operating mechanism. The operator may hold the button inwardly, or if a long run of pictures is to be taken, the button may be turned so the pin 119 will engage a shoulder 120ª on lug 115, whereupon the wheel 71 will be free to permit the motor to drive the operating mechanisms until the motor has run down or the button 113 is released.

In order to equalize the operation of the mechanism, and cause uniform exposures while the camera is being operated by the motor, automatic means is provided for controlling the speed of the shutter. The latter is formed to act as a fly-wheel, and carries a series of three spring strips 122, which lap the periphery of the wheel. Each of said strips has one of its ends secured, as at 123, to the rim of the fly-wheel, and its other end extends over a radial pocket 124 formed in the fly-wheel and carrying a ball 125 which is adapted to operate the spring plates 122 outwardly by centrifugal force to vary the pressure between the band 110 and the fly-wheel responsively to variations in the speed of the fly-wheel. A strip of suitable friction material 126, such as raw hide, is applied to the outer face of each of the strips 123. An adjustable screw 128 is threaded to the front plate 17, and by adjusting the screw, the normal position of the band 110 may be varied to cause the fly-wheel to operate at the desired speed. Button 113 is removably connected to the end of shaft 114 by a screw 129, to permit removal of the entire operating mechanism and frame structure.

This construction exemplifies one in which a fly-wheel, carrying a shutter, is utilized to automatically control, start and stop the operating mechanism.

An indicator for the length of the film which has been exposed is operated from an eccentric 130 on shaft 47. This eccentric operates a lever 131 which is fulcrumed at 132 to the frame-side 15, to rock a lever 133 which carries a pawl 134, which operates a ratchet 135, which is pivoted on a plate 136 which is fixed to and extends between the top of the frame plates 15 and 16. Ratchet 135 rotates a suitable gear-train 138 which has indications of the length of the exposed portion of the film, which are visible through an opening 139 in the top of the case.

A direct focusing device consists of an oblique mirror 140 in a housing 141, which has a tube 142 connected to its outer side. An opening 143 is formed in the side of the cover-section 27 of the case, which registers with the tube 142, and is normally closed by a removable cover 144. When the cover 144 is open, the lens may be adjusted to bring the object into correct focus on the film.

A view-finder consists of a lens 150 in the front of the body-section of the case, an oblique reflector 151 in a housing 152 at the upper front corner of the body-section, and a lens 153 in the top of said section. This finder is designed to locate the object while the camera is held at the side of the operator.

A direct view finder, consists of a frame 155 which is hinged, as at 156, to the top 27$^c$ of the cover-section, so the object may be located by view from the rear of the camera.

The operation will be as follows: A spool 34, containing a roll of film, is placed on the shaft 37, and an empty spool 34$^a$ is placed on the shaft 44. The film is then threaded by endwise insertion between the upper portion of the feed-sprocket 46, spring pressed guide-rollers 63 and pressure rollers 64, thence between the gate plate 51 and guide 49, and then between the sprocket 46 and lower rollers 64 and 63, the end being suitably attached to the take-up spool 34$^a$. A characteristic of the construction exhibited is that the top and bottom, as well as the ends of the feed and guide devices for the film, are all exposed and readily accessible for the manipulation of the film when the cover section is open. To wind the spring-motor, a crank is applied to the outer end of the shaft 79 and turned until the spring is fully wound. During this winding operation, the ratchet connection between the pinion 95 and gear 98 will permit the spring to be wound up without operating the gear 98 and the feed devices and shutter. When it is desired to make a run of pictures, the button 113 will be pressed inwardly to release the band 110, so that the fly-wheel 71 will be free to be operated by the spring-motor, the film-feed devices being simultaneously operated in synchronism therewith. If it is desired to expose the entire film, the controller-shaft 114 may be locked by means of pin 119 in position to release the band 110 in its released position. During this operation, the centrifugal balls 125 will act upon the springs 122 to vary the pressure against the band 110, so that the speed of operation will remain substantially uniform despite variation in the force of the spring during its unwinding. If it should be desired to operate the camera manually, in lieu of by the spring-motor, as is sometimes desirable for special work, the crank is applied to the outer end of shaft 47 and rotated so that the feed-operating mechanism and shutter will be operated. If it should be desired to make a single picture or a still picture, the button 108 will be turned, which will produce one exposure for each rotation of the button.

The invention exemplifies a camera, in which the operating mechanisms are supported in a frame-structure, which is mounted in and removable from the body-section of the case, and in which the cover-section permits free and convenient access to the film-operating parts for threading and other manipulation; also one in which the shutter-wheel is controlled by a device which conjointly serves to start, stop and regulate the speed of the mechanism when it is being operated by the spring motor. If access is desired to any of the motor parts for repair or the like, the entire frame-structure may be conveniently removed from the body-section of the case. It also exemplifies a moving picture camera which is simple in construction, and can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a motion picture camera, the combination of an enclosing case comprising a body-section having an open side and a cover section, a frame structure including a plate fitting in the body-section and disposed substantially in the plane of the open side of the body-section, means carried by and projecting from the outer side of the plate for supporting supply and take-up spools for endwise placement and removal, a continuous feed sprocket supported on the outside of said plate, and adapted for endwise insertion of the film, film-guiding means provided with an exposure opening and projecting outwardly from the outer side of the plate, a device for intermittently moving the film, gearing, for driving the sprocket and feed device, mounted on the inner side of said plate and in said structure, and a shutter operated by said gearing and carried by said structure, said spool supporting means, feed sprocket and film guiding means being outside of the body section to render them conveniently accessible when the cover section is open and enclosed by said cover section when it is closed.

2. In a motion picture camera, the combination of an enclosing case comprising a body-section having an open side and a cover section, a frame-structure removably held in the body section, and including a plate fitting in and disposed substantially in the plane of the open side of the body-section, means carried by and projecting from the outer side of the plate for supporting supply and take-up spools for endwise placement and removal, a continuous feed-sprocket supported on the outside of said plate, and adapted for endwise insertion of the film, film-guiding means provided with an exposure opening and projecting outwardly from the outer side of the plate, a device for intermittently moving the film, gearing for driving the sprocket and feed device mounted in the structure at the inner side of the plate, and a shutter operated by said gearing and carried by said structure, said spool supporting means, feed sprocket and film guiding means being outside of the body section to render them conveniently accessible when the cover section is open and enclosed by said cover section when it is closed.

3. In a motion picture camera, the combination of an enclosing case comprising a body-section having an open side and a cover section, a frame structure including a plurality of plates fitting in the body-section, the outer of said plates being disposed substantially in the plane of the open side of the body-section, means carried by and projecting from the outer side of the outer plate for supporting supply and take-up spools for endwise removal therefrom, a continuous feed-sprocket supported on the outside of said outer plate, and adapted for endwise insertion of the film, film-guiding means provided with an exposure opening and projecting outwardly from the outer side of the outer plate, a device for intermittently moving the film, gearing for driving the sprocket and feed device mounted between the plates, and a shutter operated by said gearing and carried by said structure, said spool supporting means, feed sprocket and film guiding means being outside of the body section to render them conveniently accessible when the cover section is open and enclosed by said cover section when it is closed.

4. In a motion picture camera, the combination of an enclosing case comprising a body-section having an open side and a cover section, a frame structure including a plurality of plates fitting in and removably held in the body-section, the outer of said plates being disposed substantially in the plane of the open side of the body-section, means carried by and projecting from the outer side of said outer plate, for supporting supply and take-up spools for endwise removal therefrom, a continuous feed sprocket supported on the outside of said outer plate, and adapted for endwise insertion of the film, film-guiding means provided with an exposure opening and projecting outwardly from the outer side of the outer plate, a device for intermittently moving the film, gearing for driving the sprocket and feed device mounted between the plates, and a shutter operated by said gearing and carried by said structure, said spool supporting means, feed sprocket and film guiding means being outside of the body section to render them conveniently accessible when the cover section is open and enclosed by said cover section when it is closed.

5. In a motion picture camera, the combination of an enclosing case comprising a body section having an open side and a cover section, a frame structure including a plate fitting in the body section and disposed substantially in the plane of the open side of the body-section, means carried by and projecting from the outer side of the plate for supporting supply and take-up spools for endwise placement and removal, a continuous feed-sprocket supported on the outside of said outer plate and adapted for endwise insertion of the film, film-guiding means provided with an exposure opening, and projecting outwardly from the outer side of the outer plate, a device for intermittently moving the film, gearing for driving the sprocket and feed-device mounted in the structure at the inner side of the plate, a spring-motor for driving said gearing, mounted in the structure and at the inner side of said plate, and a shutter carried by said structure and operated by said gearing, said spool supporting means, feed sprocket and film guiding means being outside of the body section to render them conveniently accessible when the cover section is open and enclosed by said cover section when it is closed.

6. In a motion picture camera, the combination of an enclosing case comprising a body-section having an open side and a cover-section, a frame-structure including a side plate fitting in the body-section and a front plate fitting in the body and cover sections, means carried by and projecting from the outer side of the side plate for supporting supply and take-up spools for endwise placement and removal, a continuous feed-sprocket supported on the outside of said side plate and adapted for endwise insertion of the film, film-guiding means provided with an exposure opening, and projecting outwardly from the outer side of the side plate, a device for intermittently moving the film, gearing for driving the sprocket and feed-device, mounted in the structure and at the inner side of the side plate, a spring-motor for driving said gearing, also mounted in the structure and at the inner side of said side plate, a shutter in front of said front plate, and a shutter shaft journalled in the front plate and operated by said gearing, said spool supporting means, feed sprocket and film guiding means being outside of the body section to render them conveniently accessible when the cover section is open and enclosed by said cover section when it is closed.

7. In a motion picture camera, the combination of an enclosing case comprising a body-section having an open side and a cover section, a frame structure including a plurality of plates fitting in the body-section, the outer of said plates being disposed substantially in the plane of the open side of the body-section, means carried by and projecting from the outer side of the outer plate for supporting supply and take-up spools for endwise placement and removal, a continuous feed-sprocket supported on the outside of said outer plate and adapted for endwise insertion of the film, film-guiding means provided with an exposure opening, and projecting outwardly from the outer side of the outer plate, a device for intermittently moving the film, gearing for driving the sprocket and feed device mounted between the plates, a spring-motor for driving said gearing mounted between said plates, and a shutter carried by said structure and operated by said gearing, said spool supporting means, feed sprocket and film guiding means being outside of the body section to render them conveniently accessible when the cover section is open and enclosed by said cover section when it is closed.

8. In a motion picture camera, the combination of an enclosing case comprising a body section having an open side and a cover-section, a frame structure removably held in the body section and including a plate fitting in the body section and disposed substantially in the plane of the open side of the body, means carried by and projecting from the outer side of the plate for supporting supply and take-up spools for endwise placement and removal, a continuous feed-sprocket supported on the outside of said outer plate and adapted for endwise insertion of the film, film-guiding means provided with an exposure opening and projecting outwardly from the outer side of the outer plate, a device for intermittently moving the film, gearing for driving the sprocket and feed device mounted in the structure and at the inner side of the plate, a spring-motor for driving said gearing mounted in the structure at the inner side of the plate, and a shutter carried by said structure and operated by said gearing, said spool supporting means, feed sprocket and film guiding means being outside of the body section to render them conveniently accessible when the cover section is open and enclosed by said cover section when it is closed.

9. In a motion picture camera, the combination of an enclosing case comprising a body section having an open side and a cover section, a frame structure removably held in the body section and including a plurality of plates fitting in the body section, the outer of said plates being disposed substantially in the plane of the open side of the body-section, means carried by and projecting from the outer side of the outer plate for supporting supply and take-up spools for endwise placement and removal, a continuous feed sprocket supported on the outside of said outer plate and adapted for endwise insertion of the film, film-guiding means provided with an exposure opening and projecting outwardly from the outer side of the outer plate, a device for intermittently moving the film, gearing for driving the sprocket and feed-device mounted between the plates, a spring motor for driving said gearing mounted between said plates, and a shutter carried by said structure and operated by said gearing, said spool supporting means, feed sprocket and film guiding means being outside of the body section to render them conveniently accessible when the cover section is open and enclosed by said cover section when it is closed.

10. In a motion picture camera, the combination of an enclosing case comprising a body section having an open side and a cover section, a frame structure including a plate fitting in the body section, and disposed substantially in the plane of the open side of the body-section, means carried by and projecting from the outer-side of the plate for supporting supply and take-up spools for endwise placement and removal, a continuous feed-sprocket supported on the outside of said plate and adapted for endwise insertion of the film, film-guiding means provided with an exposure opening, and projecting outwardly from the outer side of the plate, a device for intermittently moving the film, gearing for driving the sprocket and feed-device mounted in the structure and at the inner side of the plate, a spring motor for driving said gearing, mounted in the structure and at the inner side of said plate, means for manually operating the gearing independently of the motor, and a shutter carried by said structure and operated by said gearing, said spool supporting means, feed sprocket and film guiding means being outside of the body section to render them conveniently accessible when the cover section is open and enclosed by said cover section when it is closed.

11. In a motion picture camera, the combination of an enclosing case comprising a body-section having an open side and a cover-section, a frame structure including a plurality of plates fitting in the body-section, the outer of said plates beng disposed substantially in the plane of the open side of the body-section, means carried by and projecting from the outer side of the outer plate for supporting supply and take-up spools for endwise placement and removal, a continuous feed sprocket supported on the outside of said outer plate and adapted for endwise insertion of the film, film-guiding means provided with an exposure opening and projecting outwardly from the outer side of the outer plate, a device for intermittently moving the film, gearing for driving the sprocket and feed device mounted between the plates, a spring motor for driving said gearing mounted between said plates, means for manually operating the gearing independently of the motor, and a shutter carried by said structure and operated by said gearing, said spool supporting means, feed sprocket and film guiding means being outside of the body section to render them conveniently accessible when the cover section is open and enclosed by said cover section when it is closed.

12. In a motion picture camera, the combination of an enclosing case comprising a body-section having an open side and a cover section, a frame structure removable held in the body-section and including a plate fitting in the body-section and disposed substantially in the plane of the open side of the body, means carried by and projecting from the outer side of the plate for supporting supply and take-up spools for endwise placement and removal, a continuous feed sprocket supported on the outside of said plate and adapted for endwise insertion of the film, film-guiding means provided with an exposure opening and projecting outwardly from the outer side of the plate, a device for intermittently moving the film, gearing for driving the sprocket and feed device mounted in the structure and at the inner side of said plate, a spring motor for driving said gearing mounted in the structure and at the inner side of the plate, means for manually operating the gearing independently of the motor, and a shutter carried by said structure and operated by said gearing, said spool supporting means, feed sprocket and film guiding means being outside of the body section to render them conveniently accessible when the cover section is open and enclosed by said cover section when it is closed.

13. In a motion picture camera, the combination of an enclosing case comprising a body-section having an open side and a cover section, a frame structure removably held in the body section and including a plurality of plates fitting in the body-section, the outer of said plates being disposed substantially in the plane of the open side of the body-section, means carried by and projecting from the outer side of the outer plate for supporting supply and take-up spools for endwise placement and removal, a continuous feed sprocket supported on the outside of said outer plate and adapted for endwise insertion of the film, film-guiding means provided with an exposure opening and projecting outwardly from the outer side of the outer plate, a device for intermittently moving the film, gearing for driving the sprocket and feed device mounted between the plates, a spring motor for driving said gearing mounted between said plates, means for manually operating the gearing independently of the motor, and a shutter carried by said structure and operated by said gearing, said spool supporting means, feed sprocket and film guiding means being outside of the body section to render them conveniently accessible when the cover section is open and enclosed by said cover section when it is closed.

14. In a motion picture camera, the combination of a case comprising a body-section having an open side and a cover section, a frame-structure comprising side plates fitting in the body-section, and a front plate having a portion projecting outwardly from said side plate and into the cover-section and provided with an exposure opening, shafts projecting from the outer side of the outer-plate for supporting supply and take-up spools for endwise removal therefrom, a continuous feed sprocket carried by said structure at the outer side of said outer plate and adapted for endwise insertion of the film, film-guide means mounted on the structure, associated with the exposure-opening of said front plate, and disposed adjacent the outer side of the outer plate, a device for intermittently moving the film, gearing for driving the sprocket and feed device, carried by the structure, and a lens-holder carried by the front of the cover section in alignment with the exposure opening in the front plate, the shafts, feed sprocket and film guiding means being outside of the body section to render them conveniently accessible when the cover section is open and enclosed by the cover section when it is closed.

15. In a motion picture camera, the combination of a case comprising a body-section having an open side and a cover-section, a frame-structure, removably held in the body, and comprising a side plate fitting in the body-section, and a front plate having a portion projecting outwardly from the side plate and into the cover and provided with an exposure opening, shafts mounted in the structure and projecting from the outer side of the side plate for supporting supply and take-up spools for endwise removal therefrom, a continuous feed sprocket carried by said structure at the outer side of said side plate and adapted for endwise insertion of the film, film-guide means mounted on and removable with the structure, associated with the exposure opening in said front plate, and disposed adjacent the outer side of the side plate, a device for intermittently moving the film, gearing for driving the sprocket and feed device carried by the structure, and a lens-holder carried by the front of the cover section in alignment with the exposure opening in the front plate, the shafts, feed sprocket and film guiding means being outside of the body section to render them conveniently accessible when the cover section is open and enclosed by the cover section when it is closed.

16. In a motion picture camera, the combination of a case comprising a body section having an open side and a cover section, a frame-structure comprising a plurality of side plates fitting in the body-section and a front plate having a portion projecting outwardly from the outer side plate and into the cover and provided with an exposure opening, the outer of said side-plates being disposed substantially in the plane of the open side of the body section, shafts projecting from the outer side of the outer side plate for supporting supply and take-up spools for endwise removal therefrom, a continuous feed sprocket carried by said structure at the outer side of said outer side plate and adapted for endwise insertion of the film, film-guide means mounted on the structure, associated with the exposure-opening of said front plate, and disposed adjacent the outer side of the outer side plate, a device for intermittently moving the film, gearing for driving the sprocket and feed device, carried by the structure between the plates, and a lens-holder carried by the front of the cover-section in alignment with the exposure opening in the front plate, the shafts, feed sprocket and film guiding means being outside of the body section to render them conveniently accessible when the cover section is open and enclosed by the cover section when it is closed.

17. In a motion picture camera, the combination of a case comprising a body section having an open side and a cover section, a frame-structure, removably held in the body, and comprising a plurality of side-plates fitting in the body-section, and a front plate having a portion projecting outwardly from the outer side plate and into the cover and provided with an exposure opening, the outer of said side-plates being disposed substantially in the plane of the open side of the body section, shafts projecting from the outer side of the outer side plate for supporting supply and take-up spools for endwise removal therefrom, a continuous feed sprocket carried by said structure at the outer side of said outer side plate and adapted for endwise insertion of the film, film-guide means mounted on the structure, associated with the exposure opening of said front plate, and disposed adjacent the outer side of the outer side plate, a device for intermittently moving the film, gearing for driving the sprocket and feed device, carried by the structure between the plates, and a lens-holder carried by the front of the cover section in alignment with the exposure opening in the front plate, the shafts, feed sprocket and film guiding means being outside of the body section to render them conveniently accessible when the cover section is open and enclosed by the cover section when it is closed.

18. In a motion picture camera, the combination of a case comprising a body section having an open side and a cover section, a frame-structure comprising a side plate fitting in the body section, and a front plate having a portion projecting outwardly from said side plate and into the cover-section and provided with an exposure opening, shafts projecting from the outer side of the side plate for supporting supply and take-up spools for endwise removal therefrom, a continuous feed sprocket carried by said structure at the outer side of said side plate and adapted for endwise insertion of the film, film-guide means mounted on the structure, associated with the exposure-opening of said front plate, and disposed adjacent the outer side of the side plate, a device for intermittently moving the film, gearing for driving the sprocket and feed device carried by the structure, a rotary shutter mounted at the front of the front plate, and a lens-holder carried by the front of the cover section in alignment with the exposure opening in the front plate, the shafts, feed sprocket and film guiding means being outside of the body section to render them conveniently accessible when the cover section is open and enclosed by the cover section when it is closed.

19. In a motion picture camera, the combination of a case comprising a body section having an open side and a cover section, a frame-structure removably held in the body, and comprising a side plate fitting in the body-section, and a front plate having a portion projecting outwardly from the side plate and into the cover and provided with an exposure opening, shafts mounted in the structure and projecting from the outer side of the side plate for supporting supply and take-up spools for endwise removal therefrom, a continuous feed sprocket carried by said structure at the outer side of said side plate and adapted for endwise insertion of the film, film-guide means mounted on and removable with the structure, associated with the exposure opening in said front plate, and disposed adjacent the outer side of the side plate, a device for intermittently moving the film, gearing for driving the sprocket and feed device, carried by the structure, a rotary shutter mounted at the front of the front plate, and a lens-holder carried by the front of the cover section in alignment with the exposure opening in the front plate, the shafts, feed sprocket and film guiding means being outside of the body section to render them conveniently accessible when the cover section is open and enclosed by the cover section when it is closed.

20. In a motion picture camera, the combination of a case comprising a body section having an open side and a cover section, a frame-structure, comprising a plurality of side plates fitting in the body section, and a front plate having a portion projecting outwardly from the outer side plate and into the cover and provided with an exposure opening, the outer of said side plates being disposed substantially in the plane of the open side of the body section, shafts projecting from the outer side of the outer side plate for supporting supply and take-up spools for endwise removal therefrom, a continuous feed sprocket carried by said structure at the outer side of said outer side plate and adapted for endwise insertion of the film, film-guide means mounted on the structure, associated with the exposure-opening of said front plate, and disposed adjacent the outer side of the outer side plate, a device for intermittently moving the film, gearing for driving the sprocket and feed device, carried by the structure between the plates, a rotary shutter mounted at the front of the front plate, and a lens-holder carried by the front of the cover-section in alignment with the exposure opening in the front plate, the shafts, feed sprocket and film guiding means being outside of the body section to render them conveniently accessible when the cover section is open and enclosed by the cover section when it is closed.

21. In a motion picture camera, the combination of a case comprising a body section having an open side and a cover section, a frame-structure, removably held in the body, and comprising a plurality of side-plates fitting in the body section, and a front plate having a portion projecting outwardly from the outer side plate and into the cover and provided with an exposure opening, the outer of said side plates being disposed substantially in the plane of the open side of the body section, shafts projecting from the outer side of the outer side plate for supporting supply and take-up spools for endwise removal therefrom, a continuous feed sprocket carried by said structure at the outer side of said outer side plate and adapted for endwise insertion of the film, film-guide means mounted on the structure, and associated with the exposure opening of said front plate, and disposed adjacent the outer side of the outer side plate, a device for intermittently moving the film, gearing for driving the sprocket and feed device, carried by the structure between the plates, a rotary shutter mounted at the front of the front plate, and a lens-holder carried by the front of the cover section in alignment with the exposure opening in the front plate, the shafts, feed sprocket and film guiding means being outside of the body section to render them conveniently accessible when the cover section is open and enclosed by the cover section when it is closed.

22. In a motion picture camera, the combination of a case comprising a body section having an open side and a cover section, a frame-structure, removably held in the body and comprising a side plate fitting in the body-section, and a front plate having a portion projecting outwardly from the side plate and into the cover and provided with an exposure opening, the side plate being disposed substantially in the plane of the open side of the body-section, shafts projecting from the outer side of the side plate for supporting supply and take-up spools for endwise removal therefrom, a continuous feed-sprocket carried by said structure at the outer side of said side plate and adapted for endwise insertion of the film, film-guide means mounted on the structure and associated with the exposure opening in said front plate, disposed adjacent the outer side of the side plate, a device for intermittently moving the film, mechanism for driving the sprocket and feed device, carried by the structure, a lens-holder carried by the front of the cover-section in alignment with the exposure opening in the front plate, and a spring motor for driving said mechanism mounted at the inner side of said side plate, the shafts, feed sprocket and film guiding means being outside of the body section to render them conveniently accessible when the cover section is open and enclosed by the cover section when it is closed.

23. In a motion picture camera, the combination of a case comprising a body section having an open side and a cover section, a frame-structure removably held in the body and comprising a plurality of side plates fitting in the body-section, and a front plate having a portion projecting outwardly from the outer side plate and into the cover and provided with an exposure opening, the outer side plate being disposed substantially in the plane of the open side of the body-section, shafts projecting from the outer side of the outer side plate for supporting supply and take-up spools for endwise removal therefrom, a continuous feed-sprocket carried by said structure at the outer side of said outer side plate and adapted for endwise insertion of the film, film-guide means mounted on the structure, associated with the exposure opening of said front plate, and disposed adjacent the outer side of the outer side plate, a device for intermittently moving the film, mechanism for driving the sprocket and feed-device, carried by the structure, a lens-holder carried by the front of the cover-section in alignment with the exposure opening in the front plate, and a spring-motor for driving said mechanism, mounted between said plates, the shafts, feed sprocket and film guiding means being outside of the body section to render them conveniently accessible when the cover section is open and enclosed by the cover section when it is closed.

24. In a motion picture camera, the combination of a case comprising a body section having an open side and a cover section, a frame-structude, removably held in the body and comprising a side plate fitting in the body-section, and a front plate having a portion projecting outwardly from the side plate and into the cover and provided with an exposure opening, the side plate being disposed substantially in the plane of the open side of the body-section, shafts projecting from the outer side of the side plate for supporting supply and take-up spools for endwise removal therefrom, a continuous feed sprocket carried by said structure at the outer side of said side plate and adapted for endwise insertion of the film, film guide means mounted on the structure and associated with the exposure opening in said front plate, disposed adjacent the outer side of the side plate, a device for intermittently moving the film, mechanism for driving the sprocket and feed device, carried by the structure, a lens-holder carried by the front of the cover-section in alignment with the exposure opening in the front plate, a rotary shutter mounted at the front of the front plate, and a spring motor for driving said mechanism mounted at the inner side of said side plate, the shafts, feed sprocket and film guiding means being outside of the body section to render them conveniently accessible when the cover section is open and enclosed by the cover section when it is closed.

25. In a motion picture camera, the combination of a case comprising a body section having an open side and a cover section, a frame-structure, removably held in the body and comprising a plurality of side plates fitting in the body-section, and a front plate having a portion projecting outwardly from the outer side plate and into the cover and provided with an exposure opening, the outer side plate being disposed substantially in the plane of the open side of the body-section, shafts projecting from the outer side of the outer side plate for supporting supply and take-up spools for endwise removal therefrom, a continuous feed-sprocket carried by said structure at the outer side of said outer side plate and adapted for endwise insertion of the film, film guide means mounted on the structure, associated with the exposure opening of said front plate, and disposed adjacent the outer side of the outer side plate, a device for intermittently moving the film, mechanism for driving the sprocket and feed device, carried by the structure, a lens-holder carried by the front of the cover-section in alignment with the exposure opening in the front plate, a rotary shutter mounted at the front of the front plate, and a spring motor for driving said mechanism mounted between said plates, the shafts, feed sprocket and film guiding means being outside of the body section to render them conveniently accessible when the cover section is open and enclosed by the cover section when it is closed.

26. In a motion picture camera, the combination of an enclosing case comprising a body section having an open side and a cover section, a frame structure including a plate fitting in the body section, and disposed substantially in the plane of the open side of the body-section, means carried by and projecting from the outer side of the plate for supporting supply and take-up spools for endwise placement and removal, a continuous feed-sprocket supported on the outside of said plate and adapted for endwise insertion of the film, film-guiding means provided with an exposure opening, and projecting outwardly from the outer side of the plate, a device for intermittently moving the film, gearing for driving the sprocket and feed-device mounted in the structure and at the inner side of said plate, a spring-motor for driving said gearing, mounted in the structure and at the inner side of said plate, a shutter carried by said structure and operated by said gearing, and controlling means for the operation of the motor mounted on the frame structure, said spool supporting means, feed sprocket and film guiding means being outside of the body section to render them conveniently accessible when the cover section is open and enclosed by said cover section when it is closed.

27. In a motion picture camera, the combination of an enclosing case comprising a body section having an open side and a cover section, a frame structure removably held in the body section and including a plate fitting in the body section and disposed substantially in the plane of the open side of the body, means carried by and projecting from the outer side of the plate for supporting supply and take-up spools for endwise placement and removal, a continuous feed sprocket supported on the outside of said plate and adapted for endwise insertion of the film, film guiding means provided with an exposure opening and projecting outwardly from the outer side of the plate, a device for intermittently moving the film, gearing for driving the sprocket and feed device mounted in the structure and at the inner side of said plate, a spring motor for driving said gearing mounted in the structure and at the inner side of said plate, a shutter carried by said structure and operated by said gearing, and controlling means for the motor mounted on and removable with the frame structure, said spool supporting means, feed sprocket and film guiding means being outside of the body section to render them conveniently accessible when the cover section is open and enclosed by said cover section when it is closed.

28. In a motion picture camera, the combination of a case comprising a body section having an open side and a cover section, a frame-structure, removably held in the body and comprising a side plate fitting in the body-section, and a front plate having a portion projecting outwardly from the outer plate and into the cover and provided with an exposure opening, the side plate being disposed substantially in the plane of the open side of the body-section, shafts projecting from the outer side of the side plate for supporting supply and take-up spools for endwise removal therefrom, a continuous feed sprocket carried by said structure at the outer side of said side plate and adapted for endwise insertion of the film, film guide means mounted on the structure and associated with the exposure opening in said front plate, disposed adjacent the outer side of the side plate, a device for intermittently moving the film, mechanism for driving the sprocket and feed-device, carried by the structure, a lens-holder carried by the front of the cover-section in alignment with the exposure opening in the front plate, a spring motor for driving said mechanism mounted at the inner side of said side plate, and controlling means for the motor mounted on said front plate, the shafts, feed sprocket and film guiding means being outside of the body section to render them conveniently accessible when the cover section is open and enclosed by the cover section when it is closed.

29. In a motion picture camera, the combination of an enclosing case, means for supporting supply and take-up spools in the case, means for guiding the film, provided with an exposure opening, mechanism for continuously and intermittently feeding the film, a spring motor for driving said mechanism, and controlling means for the operation of said mechanism by the motor, comprising a wheel, a brake in coacting relation with the wheel, means for manually manipulating the brake to start and stop the motor, and means for retarding the wheel, said last mentioned means being carried by the wheel and arranged so as to move outwardly into engagement with the brake responsively to the action of centrifugal force.

30. In a motion picture camera, the combination of an enclosing case, means for supporting supply and take-up spools in the case, means for guiding the film, provided with an exposure opening, mechanism for continuously and intermittently feeding the film, a spring-motor for driving said mechanism, and controlling means for the operation of said mechanism by the motor, comprising a wheel, a brake band in coacting relation with the wheel, means for manually manipulating the brake band to start and stop the motor, and means for retarding the wheel, said last mentioned means being carried by the wheel and arranged so as to move outwardly into engagement with the brake responsively to the action of centrifugal force.

31. In a motion picture camera, the combination of an enclosing case, means for supporting supply and take-up spools in the case, means for guiding the film, provided with an exposure opening, mechanism for continuously and intermittently feeding the film, a spring motor for driving said mechanism, controlling means for the operation of said mechanism by the motor comprising a wheel, a brake in coacting relation with the wheel, means for manually manipulating the brake to start and stop the motor, and a shutter on said wheel.

32. In a motion picture camera, the combination of an enclosing case, means for supporting supply and take-up spools in the case, means for guiding the film, provided with an exposure opening, mechanism for continuously and intermittently feeding the film, a spring motor for driving said mechanism, controlling means for the operation of said mechanism by the motor comprising a wheel, a brake-band extending around the wheel and means for manually manipulating the brake-band to start and stop the motor, and a shutter on said wheel.

33. In a motion picture camera, the combination of an enclosing case, means for supporting supply and take-up spools in the case, means for guiding the film, provided with an exposure opening, mechanism for continuously and intermittently feeding the film, a spring motor for driving said mechanism, controlling means for the operation of said mechanism by the motor comprising a wheel, a brake band extending around the wheel, and means for manually manipulating the brake band to start and stop the motor, means to lock the start and stop means in its alternative positions, and a shutter on said wheel.

34. In a motion picture camera, the combination of an enclosing case, means for supporting supply and take-up spools in the case, means for guiding the film, provided with an exposure opening, mechanism for continuously and intermittently feeding the film, a spring motor for driving said mechanism, controlling means for the operation of said mechanism by the motor comprising a wheel, a brake band in coacting relation with the wheel, means for manually manipulating the brake band to start and stop the motor, and centrifugally operable weights in said wheel, and members operated by said weights to engage the brake-band.

35. In a motion picture camera, the combination of an enclosing case, means for supporting supply and take-up spools in the case, means for guiding the film, provided with an exposure opening, mechanism for continuously and intermittently feeding the film, a spring motor for driving said mechanism, controlling means for the operation of said mechanism by the motor comprising a wheel, a brake-band in coacting relation with the wheel, means for manually manipulating the brake band to start and stop the motor, centrifugally operable weights in said wheel, resilient strips on the wheel and operable by said weights to engage the band, and a shutter secured to rotate with said wheel.

36. In a motion picture camera, the combination of an enclosing case comprising a body section having an open side and a cover section, a frame structure fitting in the body section, means carried by said structure for supporting supply and take-up spools for endwise placement and removal, continuous and intermittent film-feed devices carried by said structure projecting outwardly from the body section, and adapted for endwise insertion of the film, film-guiding means provided with an exposure opening and projecting outwardly from the body section of the case, mechanism for driving said feed devices mounted in said structure, and a direct focusing device comprising a reflector carried by the structure and projecting outwardly of the body section and a view opening in the cover section of the case said cover section being formed to enclose the film feed devices, film guiding means and direct focusing device when it is in its closed position.

37. In a motion picture camera, the combination of an enclosing case comprising a body section having an open side and a cover section, a frame structure fitting in the body section, means carried by said structure for supporting supply and take-up spools for endwise placement and removal, continuous and intermittent film feed devices on the outside of said structure and adapted for endwise insertion of the film, film-guiding means provided with an exposure opening and projecting outwardly from the body section of the case, mechanism for driving said feed devices mounted in said structure, and a direct focusing device comprising a reflector carried on and on the outside of the structure, and a view opening in the cover of the case, said structure and parts mounted therein and said reflector being removable from the case as a unit.

38. In a motion picture camera, the combination of an enclosing case comprising a body section having an open side and a cover section, a frame structure fitting in the body section, means carried by said structure for supporting supply and take-up spools for endwise placement and removal, continuous and intermittent film-feed devices projecting outwardly from the body section and adapted for endwise insertion of the film, film-guiding means provided with an exposure opening and projecting outwardly from the body section of the case, mechanism for driving said feed devices mounted in said structure, said means comprising a presser-plate, a focusing device comprising a reflector mounted on said presser-plate, and a view-opening in the cover section, said cover being formed to enclose said film feed devices and film guiding means when it is in its closed position.

39. In a motion picture camera, the combination of an enclosing case comprising a body section having an open side and a cover section, a frame structure fitting in the body section, means carried by the frame and projecting outside of the open side of the body section for supporting supply and take-up spools for endwise placement and removal, a continuous feed sprocket adapted for endwise insertion of the film and projecting outside of said open end of the body section, film guiding means provided with an exposed opening and projecting outside of said open side of the body section, a device for intermittently moving the film, gearing for driving the sprocket and feed device mounted in said structure, and a shutter operated by said gearing and carried by the structure, the spool supporting means, feed sprocket and film guiding means being outside of the body section to render them conveniently accessible when the cover is open and enclosed by the cover when it is closed Signed at Chicago, Illinois, this 24th day of September, 1925.

HERMAN A. DE VRY.